May 19, 1970     T. R. HALL     3,512,288

REMOTE CONTROL MOBILE HIGHWAY SIGN

Filed Dec. 21, 1967     2 Sheets-Sheet 1

INVENTOR.
T. R. HALL
BY Robb & Robb
Attorneys

INVENTOR.
T. R. HALL

United States Patent Office 3,512,288
Patented May 19, 1970

3,512,288
REMOTE CONTROL MOBILE HIGHWAY SIGN
Thomas R. Hall, 6500 SW. Seymour St.,
Portland, Oreg. 97225
Filed Dec. 21, 1967, Ser. No. 692,513
Int. Cl. G09f 7/00
U.S. Cl. 40—129                 7 Claims

ABSTRACT OF THE DISCLOSURE

This invention relates to a mobile highway sign and particularly such a sign as is adapted to be moved along in conjunction with a truck or other primary vehicle, the sign itself being spaced substantially rearwardly of the vehicle, and in turn on a vehicle which may be controlled from the primary vehicle, the secondary vehicle or sign vehicle being of low profile so that even in the event of collision with a following car or the like, probability of damage to such car would be minimized and since the sign is spaced from the vehicle and does not require positioning an operator thereon, the hazard to such operator is eliminated.

---

A primary object of the invention is to provide a remote control mobile highway sign which can be spaced substantially rearwardly from a vehicle and yet be controlled by such vehicle, the sign vehicle itself being in such a position that even if collision with a car results, damage to the car or vehicle would be minimized.

A particular object of the invention is to provide a vehicle of the class described and which is denoted as a secondary or sign vehicle which may be towed behind a primary vehicle which primary vehicle can supply both steering and driving power to the towed vehicle as occasion may demand, so that the position of the sign vehicle will be maintained correctly in the lane being occupied thereby.

Another object of the invention is to provide for towing a vehicle of the type adapted to support a sign thereon, provide steering control for such vehicle, and by provision of suitable cable instrumentalities vary the distance between the sign carrying vehicle and the primary vehicle in accordance with conditions which are encountered and which are desired to be brought to the attention of the traffic using the highway.

A further object of the invention is to provide means for directing power to a sign carrying vehicle so that its speed may be controlled independently of the primary vehicle or in consonance therewith as when the main vehicle or primary vehicle is moving up and down hill, it being the intent to maintain the spacing preselected as the occasion may demand.

Other and further objects of the invention will be understood from a consideration of the specification appended hereto and disclosed in the drawings, wherein.

Figure 1:
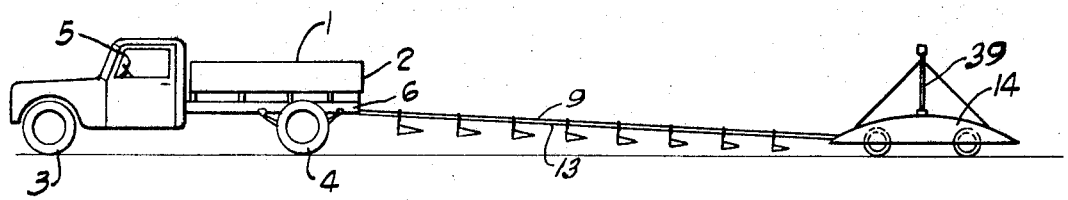
FIG. 1 is a somewhat diagrammatic view illustrating the vehicles and the relation of the same as they move or are positioned on a highway.

Referring now to FIG. 1, a primary vehicle generally designated 1 is shown as comprising a large sized truck with a bed such as 2 thereon, steering wheels 3 and drive wheels 4 with an operator station at which the steering gear of the truck is mounted and denoted at 5.

Figure 2:
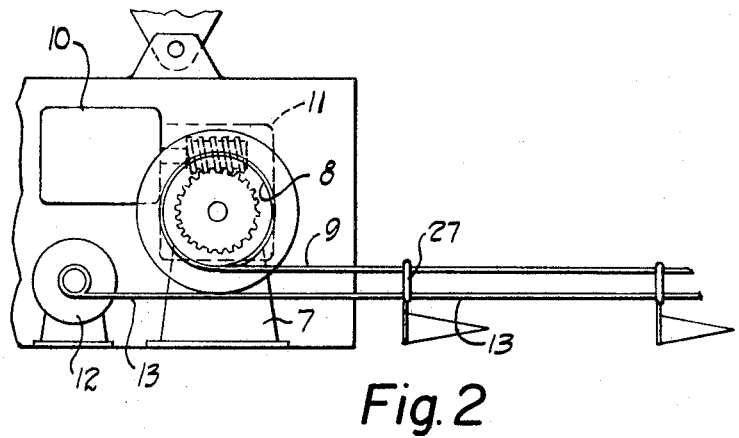
FIG. 2 is an enlarged fragmentary view, illustrating a winch arrangement for the cable extending between the vehicles.

The truck in general will be a conventional one but at the rear thereof in a position generally denoted 6, will be provided with the winch arrangement shown in enlarged detail in FIG. 2, as comprising a base 7, above which is the winch drum 8 over which the cable 9 is reeved, the drum being driven by a motor 10 through worm and gear action suggested at 11.

A spring loaded drum unit 12 is shown adjacent the drum 8 to provide for coiling an electric cable such as 13 thereon.

Figure 3:
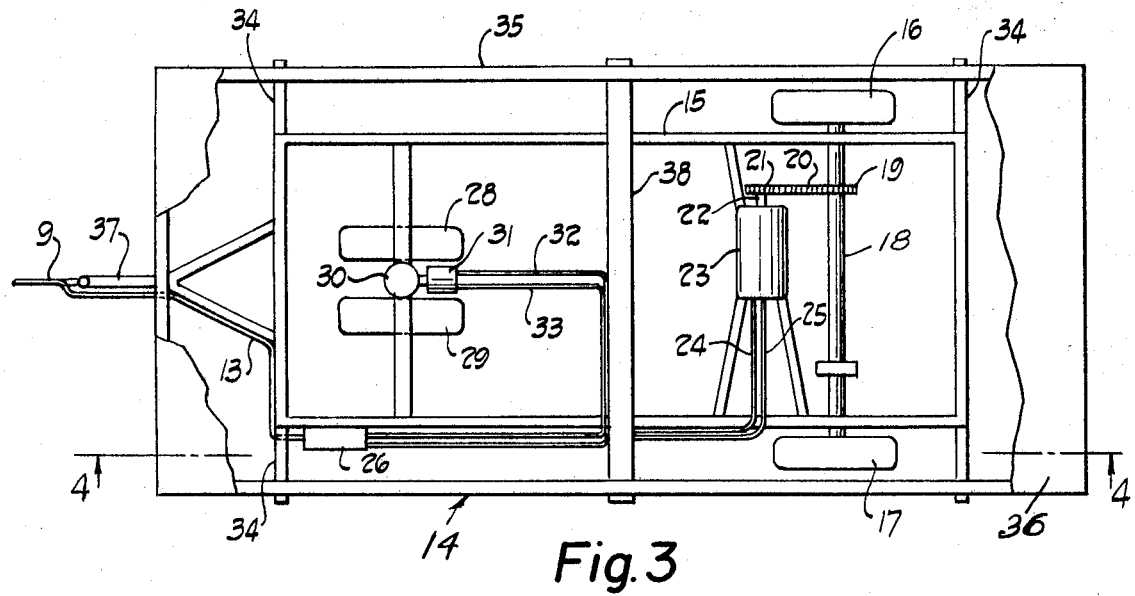
FIG. 3 is a top plan view, partly in section, of a vehicle arranged to carry out the purposes thereof.
Figure 4:
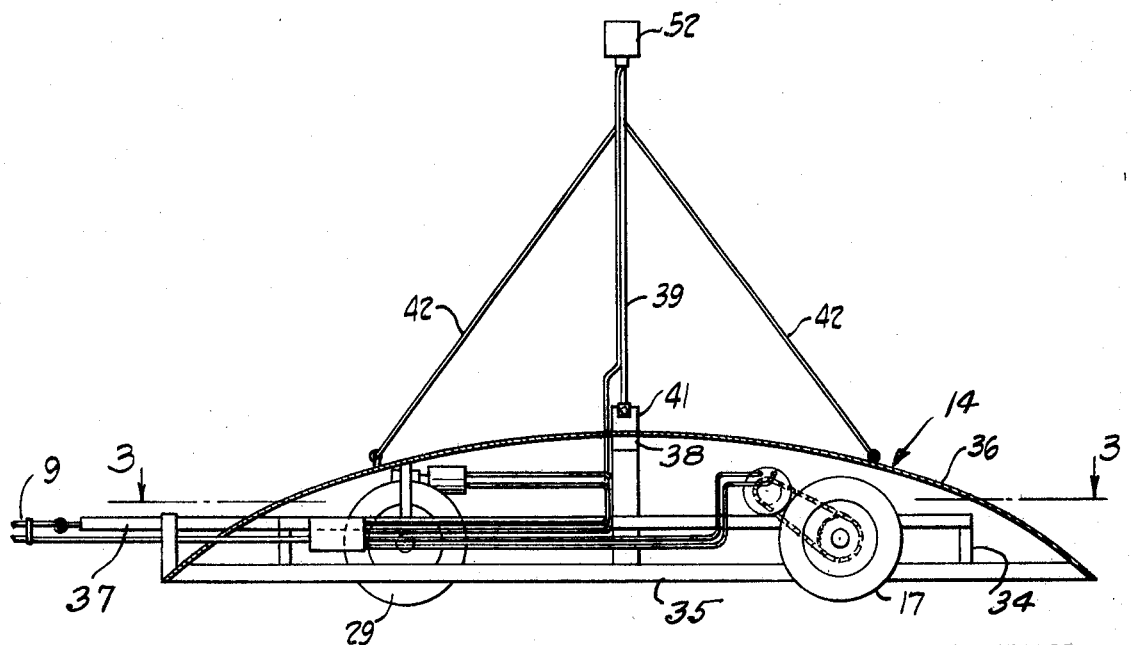
FIG. 4 is a vertical sectional view taken about on line 4—4 of FIG. 3 looking in the direction of the arrows.

The cables 9 and 13 extend rearwardly from the truck 1 as shown in FIG. 1 to a secondary vehicle generally denoted 14, which vehicle is shown in greater detail in FIGS. 3 and 4.

As shown in FIG. 3, the vehicle 14 includes a chassis 15 of generally rectilinear form, the rear end thereof being provided with a pair of wheels 16 and 17 mounted at the opposite ends of an axle 18, the axle 18 being carried or connected to the chassis frame 15 in any suitable manner.

The axle 18 is a two-part axle with a sprocket 19 connected to the front part of the axle 18, that part of the axle in turn being drivably connected to the wheels 16.

A chain 20 on the sprocket 19 is in turn carried at its opposite portion on a sprocket 21 mounted on the end of a shaft 22, extending from a motor 23, the latter being an electric motor and capable of operating as a motor and as a brake in accordance with conventional and known construction, though not further illustrated herein.

It will be seen therefore, that by energizing the motor 23 as a drive motor, wheels 16 will be in turn rotated and carry the vehicle 14 in the direction of rotation of the motor 23.

The motor 23 is connected by suitable electric connections such as 24 and 25 to a control panel 26.

The control panel 26 is in turn provided with electric power by the electric cable 13, which electric cable is suspended from the cable 9 by loops such as 27, the loops 27 being spaced and arranged to automatically space along the cable 9 in any conventional manner not forming a part of this invention.

At the forward end of the chassis frame 15, are the steering wheels 28 and 29 which are mounted on an axle extending therebetween with a vertically extending pivot being mounted in a suitable housing 30, so that the wheels 28 and 29 may rotate. The housing 30 includes therewithin a suitable gear arrangement to be driven by a worm and the latter by a motor 31 so that rotation of the wheels 28 and 29 about the axis thereof may be effected by rotating the motor 31 in either of opposite directions.

The motor 31 is in turn provided with an electrical connection 32 and 33 leading to the control panel 26 previously mentioned.

Extending from forward and rear corners of the chassis frame 15, are suitable arms such as 34 which support at the outer ends thereof a secondary frame 35 generally rectilinear in configuration which will support a covering 36 of heavy material such as metal plate arranged in a generally arcuate configuration as illustrated in FIG. 4 extending from one end to the other of the secondary frame 35 and attached thereto in any suitable manner so as to provide a rigid member.

At the forward end of the chassis frame 15, is suitable tongue arrangement 37 to which the cable 9 is attached.

Connected to the chassis frame 15 and extending transversely thereof is a rigid member 38 about centrally between the ends of said frame, to provide for the support of a sign member suggested at 39, which member 39 as indicated in FIG. 4 is provided at its lower edge portion with outwardly extending arms 40 in turn mounted in notched parts 41.

The sign 39 may have any suitable warning instructions carried thereon, and is maintained in upright position by means of light cables such as 42 extending from the upper portion thereof fore and aft to the covering 36.

Figure 6:
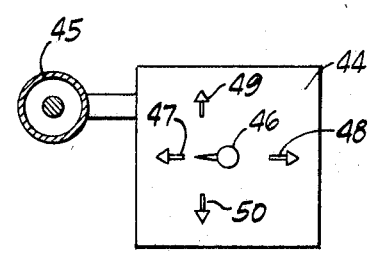
FIG. 6 is a somewhat diagrammatic view, illustrating a control unit mounted on the steering column of the primary vehicle to control the secondary vehicle.
Figure 5:
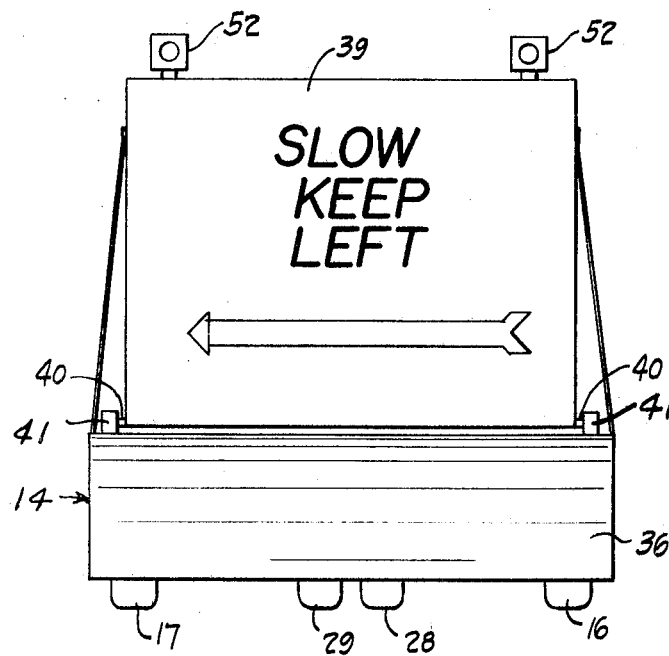
FIG. 5 is a rear view of the secondary vehicle herein.

Turning to FIG. 6, there is illustrated the control unit which is designated 44 mounted on the steering column 45 for the steering wheel 5 previously referred to.

The control unit 44 may preferably have a lever such as 46 extending upwardly therefrom and adapted to be moved right and left and fore and aft to correspond with motion desired to be directed to the secondary vehicle 14 through the electric cable 13 previously referred to.

In other words to direct forward motion to the vehicle 14 as driven by the motor 23, the lever 46 will be moved toward the arrow 47 for example. Conversely to reverse the direction of rotation of the motor 23, the arrow 48 will indicate such direction for movement of the lever 46.

When it is desired to turn vehicle 14 to the right, movement of the lever 46 toward the arrow 49 may be resorted to and similarly the arrow 50 will indicate the direction opposite thereto for steering motion of the wheels 28 and 29 previously described.

A typical manner of operation of the combination disclosed and described in detail, will now be made, and will be assumed that work is to be performed adjacent the highway and it is desired to have the warning sign sufficiently in advance thereof to warn automobiles and vehicles moving on the highway that such is taking place.

With that in mind, therefore, the truck 1 will be caused to proceed and tow behind it the vehicle 14 by means of the cable 9 until such a position is reached as will call for the truck to move slowly along behind some work being performed ahead of the same, and at that time the cable 9 will be payed out from the drum 8 to permit the vehicle 14 to assume a position sufficiently in rear of the vehicle 1 to provide the desired warning, it being understood of course that the sign 39 will indicate to the vehicles travelling along the road the existence of this situation.

The vehicle 14 may thereafter be towed along by the truck 1 and steered by regulation of the lever 46 as previously mentioned in view of the electrical connections afforded by the cable 13 and through the control panel 26 to turn the wheels 28 and 29 in the desired direction to follow the path of the roadway.

If a downward slope is encountered, the motor 23 may be energized slightly in reverse to act as a brake for the wheels 16 and thus maintain the spacing of the vehicle 14 in rear of the vehicle 1.

It may also be desired under some circumstances to have the vehicle 14 operate under its own power along behind the truck 1 and to this end the motor 23 may be accordingly energized.

Suitable warning lights such as 52 may be mounted on the upper part of the sign 39 and of course have suitable lights operating therein to call attention to the existence of the vehicle 14.

Under some circumstances it is conceivable that a following vehicle may not be properly operated and accordingly collide with the vehicle 14 and thereupon the formation of this vehicle comes into play by reason of the covering 36 thereon which will facilitate the colliding vehicle to travel up thereon and over the same if not able to be stopped.

Since the vehicle 14 and the covering thereof is close enough to the ground and by reason of the fact that the wheels may be small enough, a danger of upsetting the colliding vehicle will be minimized since the sign 39 is positioned in a relatively non-rigid arrangement that it may be displaced by collision of the vehicle therewith without greatly damaging such vehicle.

It will therefore be seen that by provision of the secondary vehicle 14 herein, at a sufficient distance from the vehicle 1, without the necessity to provide an operator therefor, will obviously provide greater safety for those people working on the highway and at the same time not provide any great hazard to careless vehicle operators.

An extremely versatile arrangement is provided herein, for use under conditions which will be readily understood by those skilled in the art.

It should be understood that in lieu of the motor 23 a suitable electric brake mechanism may be provided therefor which may be actuated by the operator of the vehicle 1 at the control station in the same manner and by the same means as heretofore described in relation to the control unit 44 mentioned.

I claim:

1. In mobile sign construction of the class described, in combination, a primary highway vehicle, an operator's station therefor, power means for said vehicle, a secondary highway vehicle having means for supporting a traffic directional control sign thereon, said sign having indicia for directing traffic displayed thereon, said secondary vehicle being adapted to be remotely positioned with respect to the primary vehicle, to provide instruction to other vehicles, and instrumentalities in said primary vehicle to control movement of the secondary vehicle.

2. The combination as claimed in claim 1, wherein said secondary vehicle includes steering means, and means are provided to interconnect said vehicles, said instrumentalities being operable to actuate said steering means.

3. The combination as claimed in claim 2, wherein the interconnecting means comprise a towing cable to pull the secondary vehicle, and a power cable to transmit energy to the steering means for operation thereof.

4. The combination as claimed in claim 3, wherein reel means are provided on the primary vehicle to vary the spacing between the vehicles.

5. The combination as claimed in claim 1, wherein the secondary vehicle includes means to regulate the speed thereof, steering means for said vehicle, the instrumentalities in the primary vehicle controlling the operation of the speed regulating and steering means aforesaid.

6. The combination as claimed in claim 1, wherein the secondary vehicle is of low profile formed to facilitate overrunning by a following vehicle, with minimum danger of damage thereto, and a sign is mounted on the secondary vehicle to present substantially no resistance to impact by an overrunning vehicle.

7. The combination as claimed in claim 1, wherein cable means interconnect the vehicles, power is transmitted from the primary to the secondary vehicle by said means, steering means are provided on such secondary vehicle, and the instrumentalities include a control unit at the operator's station, such unit including a lever member movable in directions corresponding to fore and aft and steering directions of the secondary vehicle, to effect corresponding regulation of movement of said vehicle.

References Cited

UNITED STATES PATENTS

| | | |
|---|---|---|
| 293,735 | 2/1884 | Henderson. |
| 1,346,723 | 7/1920 | Rimailho _____ 180—14 |
| 1,587,083 | 6/1926 | Neuzerling _____ 180—65 |
| 2,432,417 | 12/1947 | Heath _____ 180—14 |
| 2,714,019 | 7/1955 | Williams et al. _____ 280—480 |
| 2,843,954 | 7/1958 | Rheeling _____ 40—129 |
| 3,246,714 | 4/1966 | Middlesworth et al. ___ 180—14 |
| 3,399,489 | 9/1968 | Rogers _____ 40—129 X |

KENNETH H. BETTS, Primary Examiner

U.S. Cl. X.R.

180—14; 192—11